US006321573B1

(12) United States Patent
Fritsche et al.

(10) Patent No.: US 6,321,573 B1
(45) Date of Patent: Nov. 27, 2001

(54) PROCESS AND APPARATUS FOR MANUFACTURING A POROUS SIO$_2$ PREFORM

(75) Inventors: Hans-Georg Fritsche, Bobbau; Udo Peper, Wittenberg; Frank Neubauer, Weissandt-Gölzau; Hartwig Schaper, Aschaffenburg; Jürgen Röper, Roitzsch, all of (DE)

(73) Assignee: Heraeus Quarzglas GmbH & Co. KG, Hanau (DE)

( * ) Notice: Subject to any disclaimer, the term of this patent is extended or adjusted under 35 U.S.C. 154(b) by 0 days.

(21) Appl. No.: 09/328,751

(22) Filed: Jun. 9, 1999

(30) Foreign Application Priority Data

Jun. 25, 1998 (DE) .............................................. 198 27 945

(51) Int. Cl.$^7$ .................................................. C03B 37/018
(52) U.S. Cl. ............................... 65/421; 65/355; 65/356; 65/384; 65/385; 65/434; 65/510; 65/511; 65/512; 65/513; 65/514
(58) Field of Search ............................... 65/355, 356, 384, 65/385, 421, 434, 510, 511, 512, 513, 514

(56) References Cited

FOREIGN PATENT DOCUMENTS

| 196 28 958 A1 | 1/1998 | (DE) . |
| 196 29 170 A1 | 1/1998 | (DE) . |
| 0 476 218 A1 | 3/1992 | (EP) . |
| 0 845 441 A1 | 6/1998 | (EP) . |
| 59-190232 * | 10/1984 | (JP) ....................................... 65/421 |

OTHER PUBLICATIONS

Patent Abstracts of Japan, vol. 17, No. 367, Jul. 12, 1993 & JP 05 058647 A (Shin–Etsu Quartz Prod. Co. Ltd.), Mar. 9, 1993.

* cited by examiner

*Primary Examiner*—Michael Colaianni
(74) *Attorney, Agent, or Firm*—Andrew L. Tiajoloff

(57) ABSTRACT

In a known process for the manufacture of an elongated porous SiO$_2$ preform, SiO$_2$ particles are deposited on the mantle surface of a cylindrical carrier rotating about its longitudinal axis. The SiO$_2$ particles are formed by means of a plurality of deposition burners which are arranged, at a distance from one another, in at least one burner row extending parallel to the longitudinal axis of the carrier. The burners are moved in a repeated cycle back and forth along the forming preform and between turnaround points where the direction of their motion is reversed. Measures are taken in the process to prevent or reduce overheating of the preform in the turnaround point regions. These measures can lead to variations in the rate of deposition. In order to prevent this it is proposed according to the invention that the measures comprise localized removal of heat from the turnaround points (7), or a localized heat shielding of the regions (8) around the turnaround points (7), and that these measures be kept time-constant within a motion cycle. As far as concerns an apparatus suitable for implementation for the manufacture of a porous SiO$_2$ preform, with a cylindrical carrier rotatable about its longitudinal axis, with a plurality of deposition burners arranged in at least one burner row extending parallel to the carrier's longitudinal axis, connected with one another and at a distance from one another and with a jogging device which moves the deposition burners along the carrier and between turnaround points where the direction of the motion is reversed and by means of which burners SiO$_2$ particles are deposited on the carrier, forming the preform, it is proposed that heat sinks (12) be provided in the regions (8) around the turnaround points (7).

20 Claims, 2 Drawing Sheets

Figure 1:
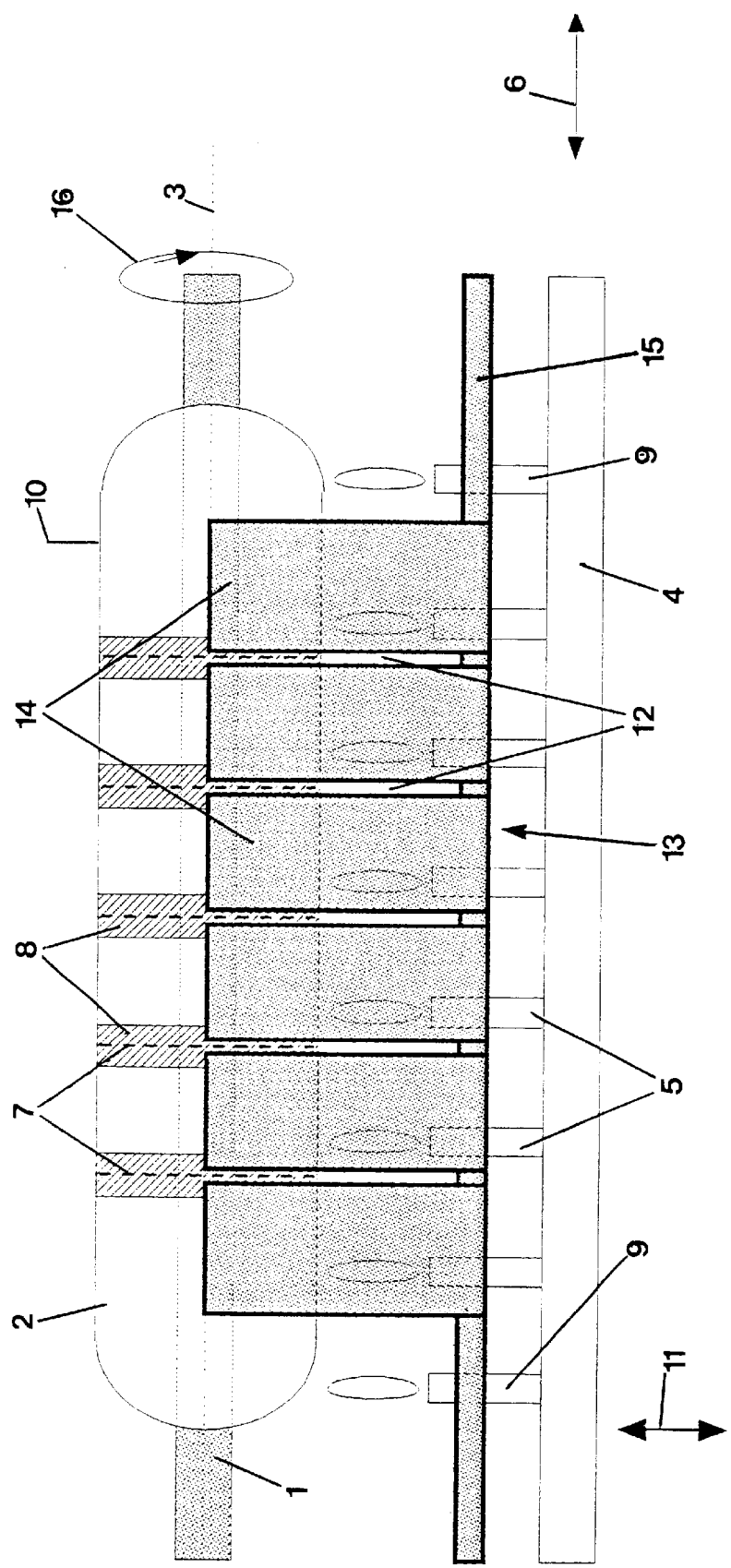

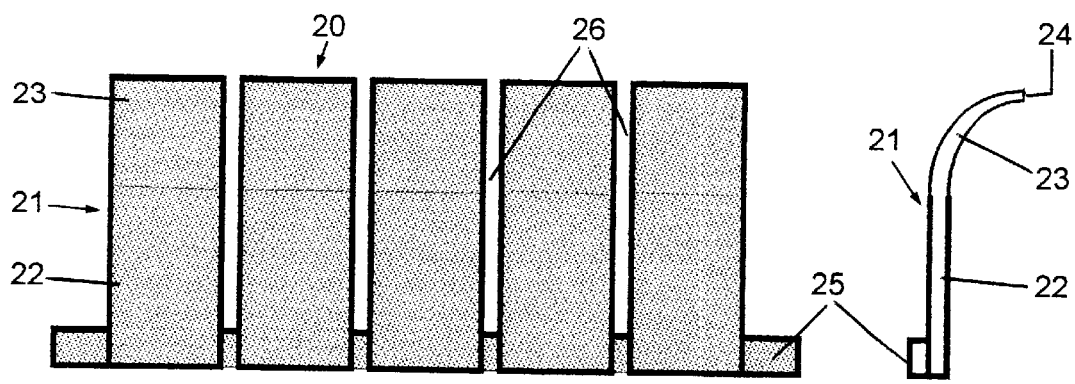
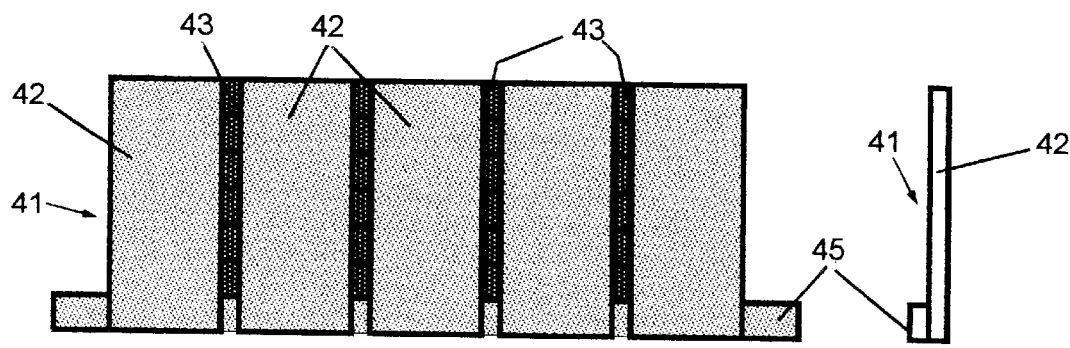
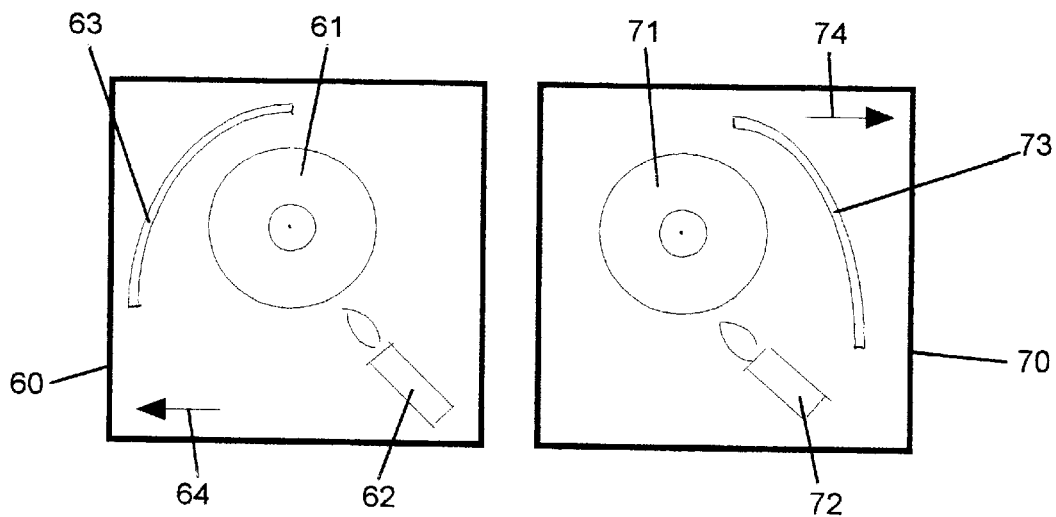

PROCESS AND APPARATUS FOR MANUFACTURING A POROUS SiO₂ PREFORM

The present invention concerns a process for manufacturing an elongated, porous, SiO$_2$ preform by deposition of SiO$_2$ particles on the mantle surface of a cylindrical carrier which rotates about its longitudinal axis. The SiO$_2$ particles are formed by a plurality of deposition burners arranged at a distance from one another in at least one burner row which extends parallel to the carrier's longitudinal axis. The burners are moved back and forth along the forming preform in a repeating motion cycle and between turnaround points where the direction of burner motion is reversed. Measures are taken to prevent or reduce an overheating of the forming preform in the turnaround point regions.

In addition, the invention concerns an apparatus for manufacturing a porous SiO$_2$ preform, with a cylindrical carrier rotatable about its longitudinal axis, with a plurality of deposition burners arranged in at least one burner row extending parallel to the longitudinal axis of the carrier and at a distance from one another and connected with one another, by means of which burners SiO$_2$ particles are deposited on the carrier, forming the preform, and with a jog device which moves the deposition burners back and forth along the carrier between turnaround points where the direction of the motion is reversed.

A device of the kind described above is known from EP A1 476 218. Described therein is the forming of an elongated porous preform from SiO$_2$ particles whereby flame hydrolysis burners deposit SiO$_2$ particles in layers on a horizontally arranged substrate rod rotating about its longitudinal axis. The burners are mounted equidistantly 10 cm apart on a burner block which extends parallel to the longitudinal axis of the substrate rod. The burner block is moved back and forth by means of an adjustable jogging device between a left and a right turnaround point, along the porous cylindrical preform being formed. The amplitude of this translational motion of the burner block is smaller than the length of the preform. The slowing of the translational motion of the burner block during the reversal of motion at the turnaround points can result in an overheating of the preform surface and hence in local axial density fluctuation in the preform. This would produce regions of differing reactivity in the preform, becoming apparent especially during subsequent chemical reactions in further treatment of the preform and could result, after, for example, sintering, in non-homogeneity of the quartz glass body. In order to avoid this it is proposed in EP A1 476 218 that both the left and the right turnaround point be relocated by a few millimeters during each burner pass. Even though this equally distributes the local density fluctuations created in the preform at the turnaround points, it does not prevent them.

To solve this problem, a process of this kind is proposed in DE A1 196 28 958, where an overheating of the preform at the turnaround points is prevented or reduced by increasing the circumferential velocity of the forming preform, or by lowering the flame temperature of the deposition burners, or by increasing the distance between the deposition burners and the preform surface. Any one or a combination of these measures makes it possible to completely or partially compensate for the temperature increase of the preform surface at the turnaround points, so that in terms of time and space the preform is subjected to as even a temperature impact as possible over its entire surface. Axial density gradients in the preform are thus largely avoided.

Spatial arrangement of turnaround points according to EP A1 476 218 requires high equipment and control expenditures. Measures proposed in DE A1 196 28 958 for avoiding local overheating in the turnaround point area require a time-related modification of gas flows, distances or relative velocities in the turnaround point regions, and these measures can cause an undesired variation of the deposition rate.

The object of the present invention is therefore to provide a simple process for manufacturing a preform with small density fluctuations while avoiding the disadvantages of the measures indicated above, as well as providing a simple apparatus suitable for implementing the process.

As far as the process is concerned, this object is achieved on the basis of the generic process in that the measures comprise local removal of heat from the turnaround point regions, or local heat shielding of the turnaround point regions, and in that the measures can be held time-constant within a motion cycle.

The deposition burners produce a temperature profile along the surface of the preform being formed, said profile being formed by the flame temperature in the area around the surface, and by the oscillating motion of the burner row. This surface temperature profile has peaks in the turnaround point regions. Such peaks are avoided by the process according to the invention by measures for local cooling (cooling measures), in that heat is removed in the turnaround point regions or in that the preform being formed is shielded from heat in the turnaround point regions. The first-mentioned cooling measures by means of local heat removal will be subsequently called "active cooling" and the last-mentioned cooling measures by means of heat shielding will be called "passive cooling."

The action of the measures for the active and passive cooling of the preform is above all limited locally to the respective turnaround point regions. Their action is based either on shielding the preform surface from heat in the turnaround point regions or conducting heat in these regions away from the preform surface. In either case, the cooling measures contribute to a homogenization of the preform surface temperature. In the ideal case the extent of heat shielding or of heat removal is precisely such that the temperature increase resulting from the burner motion is exactly compensated in the turnaround point regions. Density gradients in the preform are avoided or reduced in this way.

The cooling measures are placed at the turnaround points of the burner motion. In cases where the turnaround points are spatially constant the effect of the cooling measures is spatially constant; otherwise, in conjunction with a shifting of the turnaround points, it is spatially variable.

A special feature of the process according to the invention is that the cooling measures are kept—at least within one motion cycle of the burner row —constant in relation to time. What is meant by this is that a controlled or regulated changing of the parameters of the cooling measures, for example depending on the motion cycle of the burner row, is not required; the corresponding expenditures for control and regulation are thus eliminated.

The time-related constancy of the cooling measures does not relate to their effectiveness. The latter can be variable in relation to time because the effect of active or passive cooling increases in proportion to an increase of the heat quantity to be shielded or removed in the area of a turnaround point. The respective cooling measures are therefore most effective just when heating of the preform by the deposition burners is especially great, that is, when they sweep over the regions around the turnaround points.

In a kinetic reversal, it is the carrier that can be moved back and forth between the turnaround points.

With active cooling heat is removed from the preform surface in the turnaround point region. Heat can be removed by, for example, cooling elements such as, for example, fluid- or gas-cooled components which act in the turnaround point regions, or by streams of cooling gas directed at the preform surface in the turnaround points regions. As an alternative, heat can be removed from the turnaround point regions by heat conductors, by convection, or by heat flow. Flow devices which act in the turnaround point regions need to be provided to generate effective heat convection or flow.

One technique has been shown particularly effective in producing suitable heat conduction, convection or heat flows, wherein a heat shield extends along the preform being formed. The heat shield is provided with heat sinks in the turnaround point regions, and heat is removed locally by means of the said sinks. The heat shielding reduces heat loss in the region between the turnaround points. In this way heat accumulates at the preform surface between the turnaround points while heat is removed by means of heat sinks in the regions around the turnaround points. The effects of the heat shielding between the turnaround points on the one hand, and of the active cooling by heat sinks in the turnaround point regions on the other hand thus reinforce and complement each other.

In the simplest case heat is removed locally by means of heat sinks in the form of openings in the heat shielding. The heat shielding extends along the preform and heat can move to the outside, due to flowing or convection, through openings in the heat shielding. The openings can for example be designed as equidistantly spaced slots in the heat shielding.

As an alternative to or in addition to the slots, heat sinks in the form of surfaces which absorb infrared radiation are provided in the turnaround point regions. Heat is conducted to the outside through the infrared radiation-absorbing surfaces away from the preform surface.

As concerns the apparatus, the above object is achieved on the basis of the apparatus described initially in that heat sinks are provided in the turnaround point regions.

The deposition burners generate a temperature profile along the preform being formed. This profile results from the flame temperature in the area of the surface and from the oscillating motion of the burner row. The temperature profile has peaks in the turnaround point regions. In order to avoid these peaks the apparatus according to the invention provides heat sinks in the turnaround point regions. Heat can be removed away from the preform surface by means of the said heat sinks in the turnaround point regions—substantially limited locally to the turnaround point regions. In this way the heat sinks contribute to a homogenization of the preform surface temperature. In the ideal case, the effect of the heat sinks is so precise that it exactly compensates the temperature increase in the turnaround point regions due to the motion of the burner row. Density gradients in the preform are thus avoided or reduced.

The heat sinks are located at the burner row turnaround points. In the event that the turnaround points are kept spatially constant, the heat sinks are kept spatially constant as well. Otherwise they are spatially variable, along with a shifting of the turnaround points. In a kinetic reversal it can be the preform which is moved between the turnaround points. In such case the heat sinks are moved with the preform.

A special feature of the apparatus according to the invention is that the heat sinks can be held constant in relation to time within a motion interval of the burner row. What is meant by this is that there is no need for controlled or regulated change of heat sink parameters, such as, for example, those depending on the motion cycle of the burner row. Distinguished from this should be the heat sinks' effectiveness, which increases proportionately with the increase of the heat quantity in the turnaround point regions. The heat sinks are therefore especially effective precisely when the preform is being heated particularly strongly by the deposition burners, that is, when the burners sweep over the turnaround point regions.

In a preferred further embodiment of the apparatus according to the invention, there extends along the preform being formed at least one heat shield in which the heat sinks are configured. Usually the heat shield extends along at least the entire usable length of the preform (this means the entire length of the preform less any existing tapering preform ends). Loss of heat between the turnaround points is to be reduced by the heat shielding. Heat accumulates at the preform surface in the regions between the turnaround points and is removed by means of the heat sinks from the regions around the turnaround points. In this way the heat shield and the heat sinks complement and reinforce each other. In accordance with this effect and function of the heat shielding, its form, extent and arrangement in relation to the preform can be easily adjusted and optimized in the given circumstances by one skilled in the art. A heat shield extending only over a portion of the preform circumference is sufficient and many forms are possible, for example a flat plate extending parallel to the carrier's longitudinal axis, or a shell bent around the carrier's longitudinal axis.

Especially simple is the apparatus according to the invention where the heat sinks are configured as openings provided in the heat shielding in each turnaround point region. In the simplest case, the heat shielding extends as a flat plate along the preform being formed and heat can travel to the outside through the openings due to flowing or convection. For example, the openings can be designed as evenly spaced slits in the regions around the turnaround points.

As an alternative or in addition to such openings, the heat shielding which extends along the preform is provided in the turnaround point regions with surfaces which absorb infrared radiation. Heat is conducted to the outside, away from the preform surface, by the infrared radiation absorbing surfaces.

Heat sinks designed as cooling elements have been shown to be especially suitable. Such cooling elements are easily constructed, for example, as Peltier elements, or in form of liquid- or gas-cooled components, or as cooling gas jets directed at the preform surface in the turnaround point regions.

In a preferred embodiment of the apparatus according to the invention, the heat sinks and burner row are arranged on the same side of the carrier and the burner row extends between the carrier and the heat shielding. In this arrangement, the heat shielding also protects the area behind the burner row (viewed from the preform) from burner heat, such as, for example, a housing wall.

The invention will be explained below in more detail by means of a drawings. The drawings schematically show in FIG. 1: a frontal view of an embodiment of the apparatus according to the invention, FIG. 2: a frontal view of an embodiment of a shield to be used in an apparatus according to the invention, FIG. 3: a side view of a shield according to FIG. 2, FIG. 4: a front view of a further embodiment of a shield to be used in an apparatus according to the invention, FIG. 5: a side view of a shield according to FIG. 4, FIG. 6: a side view of a further embodiment of the apparatus according to the invention, and FIG. 7: a side view of a further embodiment of the apparatus according to the invention.

In the apparatus shown schematically in FIG. 1, there is provided a carrier 1 made of aluminum oxide which is rotatable about its longitudinal axis 3 and on which a porous preform 2 is formed by $SiO_2$ particles. The advantageous rotational direction of the carrier 1 is shown by directional arrow 16. Deposition of $SiO_2$ particles takes place by means of quartz glass deposition burners 5 which are mounted in a row on a burner block 4 extending parallel to the longitudinal axis 3 of the carrier 2. Burner block 4 jogs back and forth along longitudinal axis 3 between two turnaround points 7 which are fixed in relation to the longitudinal axis 3 of the carrier 1. The amplitude of the back and forth motion is shown by directional arrow 6. It measures approximately 20 cm and corresponds (as viewed in the direction of the axis 3) to double the distance between the deposition burners 5. The length of the turnaround points 7 is constant in relation to the preform surface. Therefore, in FIG. 1, the turnaround points 7 of the back and forth motion of the individual deposition burners 5 are projected onto the preform surface as the centerlines of the shaded areas, and these areas are intended to each indicate a region 8 around a turnaround point 7. The burner block 4 is connected to a drive (not shown in FIG. 1) which causes the back and forth movement.

The row of burners 5 is completed at each end by an additional burner 9. The additional burners 9 are also mounted on the burner block 4, and their distance from the adjoining burner 5 in each case corresponds to the above-indicated burner spacing. The flame temperature of the additional burners 9 is set to approximate that of the burners 5. Their function is to provide a temperature profile in the end zones which is similar to that of the central zones. Deposition burners 5 are each supplied with oxygen and hydrogen as flame gases and with liquid $SiCl_4$ as the starting material for $SiO_2$ particles. Both additional burners 9 are supplied with flame gases only.

The distance between the surface 10 of the preform 2 and the burner block 4 is kept constant during the deposition process. For this purpose the burner block 4 is movable in a direction perpendicular to the longitudinal axis 3 of the carrier 1 as indicated by arrow 11.

According to the invention the apparatus is provided with heat sinks for heat removal in the regions 8 around the turnaround points 7. The heat sinks in the embodiment shown in FIG. 1 are designed as slits 12 with a width of 30 mm in a comb-shaped shield 13 which is fixed and extends along the usable length of the preform 2. The comb-shaped shield 13 is made of stainless steel and has a thickness of 1.5 mm and a height of 300 mm. The shield 13 extends, at a distance of 350 mm, tangentially to the cylinder mantle surface of the carrier 1, and the lower edge of the shield 13 starts about 50 mm below the central axis 3 of the preform 2. In order to emphasize the relationship between the slits 12 of the shield 13 and the regions 8 projected onto the preform surface in the regions of the turnaround points 7, the schematic representation in FIG. 1 shows a variation of the arrangement of preform 2 and shield 13 in relation to each other. Due to the continuous slits 12, the shield 13 is divided into equal screens 14 which are held by a common bar 15.

Shield 13 is arranged behind the burner row 5 as seen from preform 2. Turnaround points 7 are located within the projection of the slits 12 onto the preform 2. The screens 14 cover substantially the regions between the turnaround points 7. The screens 14 contribute to keeping the heat generated by the burners 5 in the area of the preform 2 while the slits 12, functioning as heat sinks, make the removal of heat possible in the area 8 of the turnaround points 7.

An example of the process according to the invention will be explained below by way of FIG. 1.

$SiO_2$ particles are deposited on the surface 10 of the rotating preform 2 by means of deposition burners 5. The burners 5 are moved back and forth along the preform surface 10 in equal motion cycles between spatially constant turnaround points 7. The circumferential velocity of preform 2 is set to a constant 10 m/min during the entire deposition process. The average translational velocity of the burner block 4 is 350 mm/min and is kept constant both during the entire motion cycle and during the entire deposition process (as far as the rate is concerned); the slowing and accelerating in the turnaround point regions are not considered as they can be disregarded in establishing the average translational velocity. The slowing and accelerating distances are in the neighborhood of a few millimeters.

The temperature of the preform surface 10 is measured continuously. A pyrometer is directed at the preform surface 10 and its field of measurement is located in the flame impingement zone of one of the central deposition burners 5. The pyrometer is joined with the burner block 4 and is moved with it back and forth. It is a "Infratherm ⅕" pyrometer manufactured by IMPAC and its measurement wavelength is about 5.14 im. The distance between the pyrometer and the preform surface 10 is 30 cm and the diameter of the measurement field is about 5 mm. The flame impingement area of deposition burner 5 has a diameter of about 15 mm. The values determined by these measurements yield a base value of the surface temperature as the lowest temperature during a motion cycle, i.e. a forward and back movement of the burner block 4. The base temperature of the preform surface during the deposition process is found to be about 1,250° C. It should be noted that as the circumference of the preform 2 increases the surface 10 cools faster due to increasing heat radiation, among other things. In order to maintain the base surface temperature value of 1,250° C., measures are required to counteract the faster cooling rate. For this purpose the flame temperature of the burners 5 in the example is increased continuously.

The circumferential velocity of preform 2 and the average translational velocity of burner block 4 are relatively small. Therefore the rate of the relative motion between deposition burners 5 and preform surface 10 are small, resulting in thorough heating of the preform 2 in the burner flame impingement zone. This effect is increased even more by the action of the comb-shaped shield 13. This is so because especially in those intervals when the deposition burners 5 (as shown in FIG. 1) are behind the screens 14, the screens 14 reduce the backward flow of heat generated by the burners 5, away from preform surface 10. On the other hand, removal of the heat to the rear is facilitated as soon as the deposition burners 5 (as shown in FIG. 1) are behind the slits 12, that is in the region 8 of the turnaround points 7. As a result, a temperature increase due to the double heating of preform surface 10 by the back and forth movement in the region 8 of the turnaround points 7 is largely avoided. The temperature in the example described was found to be merely 30° C. This assures a relatively flat temperature curve between the turnaround points 7 and thus a low density gradient of preform 2 in this region.

Further embodiments of the shield described above and its arrangement in apparatuses according to the invention will be described in more detail below by way of FIGS. 2–7.

Shield 20 shown in FIGS. 2 and 3, for use in an apparatus according to the present invention, is made of stainless steel screens 21 with a thickness of 1.5 mm. Said screens have a lower, flat section 22 and an upper, concave section 23. The bent upper section 23 is shaped in approximation of the preform. The free upper edge 24 of the bent section is turned toward the preform when the screen 21 is used in an apparatus according to the invention. The screens 21 are held by a common bar 25. Continuous slits 26 with a width of 40 mm are provided between the screens.

The embodiment of the shield according to FIGS. 4 and 5 is a flat stainless steel sheet 41 with alternating surfaces 42 which reflect infrared radiation and surfaces 43 which absorb infrared radiation. The shield has a height of 300 mm. The width of the absorbing surface 43 is 50 mm. The absorbing surfaces 43 act as heat sinks when shield 42 is used in an apparatus according to the present invention. For this they are arranged in the region of the turnaround points. The stainless steel shield 41 is held by a bar 45.

The frontal view of a further embodiment of the apparatus according to the present invention as shown in FIG. 6 represents a housing 60 within which are arranged a preform 61, a burner 62 which is directed at the preform, and a heat shield 63. The heat shield 63 which has a concave shape to approximate the shape of the preform 61, is arranged on the side of the preform opposite the burner 62. The distance between the heat shield 63 and the preform being formed is set at a constant 100 mm by moving the preform during the deposition process in the direction of arrow 64.

The apparatus according to the invention shown schematically in FIG. 7 shows, within a housing 70, an arrangement with a preform 71, a deposition burner 72 and a heat shielding 73 as they have been already described above in more detail by way of FIG. 1. The deposition burners 72 are between preform 71 and shielding 73. In the example the distance between the preform surface and the shielding is 200 mm. The distance is kept constant during the process by moving the shielding 73 in the direction of arrow 74.

Temperature peaks in the regions of the turnaround points of the burner motion can be prevented by the process according to the invention without incurring high costs for equipment and controls.

What is claimed is:

1. A process for the manufacture of a porous, elongated $SiO_2$ preform by deposition of $SiO_2$ particles on a mantle surface of a cylindrical carrier rotating about a longitudinal axis, said process comprising:

forming the $SiO_2$ particles by means of a plurality of deposition burners which are supported spaced at a distance from one another and in at least one burner row extending substantially parallel to the longitudinal axis of the carrier, providing for reciprocal relative longitudinal movement between the preform and the deposition burner in repeating cycles reciprocating back and forth along the forming preform between turnaround points where the movement is reversed; and wherein measures are taken to prevent or reduce overheating of the preform in regions adjacent the turnaround points, the measures including local removal of heat from the regions adjacent the turnaround points or a local heat shielding of the regions adjacent the turnaround points, said measures being time-constant within each cycle of relative movement and said measures being taken at locations that remain longitudinally fixed relative to the preform during said reciprocal longitudinal movement.

2. The process according to claim 1, and further comprising providing a heat shield that extends along the forming preform, and, as part of the measures taken, said heat shield being provided in the regions adjacent the turnaround points with heat sinks by which heat is removed locally.

3. The process according to claim 2, wherein the heat shield has openings therein that form said heat sinks that remove heat locally in the regions adjacent the turnaround points.

4. A process for the manufacture of a porous, elongated $SiO_2$ preform by deposition of $SiO_2$ particles on a mantle surface of a cylindrical carrier rotating about a longitudinal axis, said process comprising:

forming the $SiO_2$ particles by means of a plurality of deposition burners which are supported spaced at a distance from one another and in at least one burner row extending substantially parallel to the longitudinal axis of the carrier, providing for reciprocal relative longitudinal movement between the preform and the deposition burner in repeating cycles reciprocating back and forth along the forming preform between turnaround points where the movement is reversed; and wherein measures are taken to prevent or reduce overheating of the preform in regions adjacent the turnaround points, the measures including local removal of heat from the regions adjacent the turnaround points or a local heat shielding of the regions adjacent the turnaround points, said measures being time-constant within each cycle of relative movement; and wherein heat is removed locally in the regions adjacent the turnaround points through heat sinks formed by surfaces which absorb infrared radiation.

5. An apparatus for the manufacture of a porous elongated $SiO_2$ preform by deposition of $SiO_2$ particles, said apparatus comprising:

a cylindrical carrier rotating about a longitudinal axis and providing a mantle surface onto which the $SiO_2$ particles are deposited;

a plurality of deposition burners forming the $SiO_2$ particles, said deposition burners being arranged spaced at a distance from one another and in at least one burner row extending parallel to the longitudinal axis of the carrier;

the burners and the carrier being supported so as to have relative reciprocating longitudinal movement therebetween in a repeating cycle back and forth along the forming preform between turnaround points at which the longitudinal movement is reversed; and means for preventing or reducing overheating of the preform in regions adjacent the turnaround point, said means including heat sinks provided in the regions adjacent the turnaround points; and said heat sinks being longitudinally fixed relative to the preform during said reciprocating longitudinal movement.

6. The apparatus according to claim 5, and said means for preventing or reducing overheating comprising a heat shield extending along the forming preform, said heat shield having the heat sinks formed therein.

7. The apparatus according to claim 6, wherein the heat shield has structure defining openings therein in the regions adjacent the turnaround points, which openings act as the heat sinks.

8. An apparatus for the manufacture of a porous elongated $SiO_2$ preform by deposition of $SiO_2$ particles, said apparatus comprising:
- a cylindrical carrier rotating about a longitudinal axis and providing a mantle surface onto which the $SiO_2$ particles are deposited;
- a plurality of deposition burners forming the $SiO_2$ particles, said deposition burners being arranged spaced at a distance from one another and in at least one burner row extending parallel to the longitudinal axis of the carrier;
- the burners and the carrier being supported so as to have relative reciprocating longitudinal movement therebetween in a repeating cycle back and forth along the forming preform between turnaround points at which the longitudinal movement is reversed;
- means for preventing or reducing overheating of the preform in regions adjacent the turnaround point, said means including heat sinks provided in the regions adjacent the turnaround points; and
- wherein the heat sinks are designed as surfaces which absorb infrared radiation, said surfaces being provided in the heat shielding in the regions adjacent the turnaround points.

9. The apparatus according to claim 5 wherein the heat sinks are cooling elements.

10. The apparatus according to claim 5, wherein the means for preventing or reducing overheating comprises a heat shield, the heat shield and the burner row are arranged on the same side of the carrier, and the burner row extends between the carrier and the heat shielding.

11. An apparatus for the manufacture of a porous elongated $SiO_2$ preform by deposition of $SiO_2$ particles, said apparatus comprising:
- a cylindrical carrier rotating about a longitudinal axis and providing a mantle surface onto which the $SiO_2$ particles are deposited;
- a plurality of deposition burners forming the $SiO_2$ particles, said deposition burners being arranged spaced at a distance from one another and in at least one burner row extending substantially parallel to the longitudinal axis of the carrier;
- the burners and the carrier being supported so as to have relative reciprocating longitudinal movement therebetween in a repeating cycle back and forth along the forming preform, said relative reciprocating longitudinal movement causing each of said deposition burners to relatively reciprocate between two turnaround points on the preform at which the longitudinal movement of the burner relative to the preform reverses; and
- a heat shield supported spaced from the preform, said heat shield having a plurality of heat sinks supported to remain longitudinally fixed relative to the preform during the reciprocating longitudinal movement, each heat sink being aligned with a respective turnaround point on the preform and reducing heat in a region adjacent the respective turnaround point.

12. The apparatus of claim 11 wherein the heat sinks are cooling elements.

13. The apparatus of claim 21 wherein the heat sinks are structures forming openings in the heat shield which permit heat from the regions of the turnaround points to escape therethrough.

14. The apparatus of claim 11 wherein
- the heat shield is supported so as to remain longitudinally fixed relative to the preform during the reciprocating longitudinal movement, said heat shield comprising
  - a plurality of heat shield members each extending adjacent the preform and each fixedly aligned with a respective longitudinal region between a respective pair of turnaround points on the preform, said heat shield member maintaining heat in said region;
  - said heat shield members being spaced longitudinally from each other and providing the heat sinks by defining a space therebetween that is aligned longitudinally fixed with respect to the associated turnaround point and reduces heat in a region thereof.

15. The apparatus of claim 14 wherein said heat shield members are fixedly supported on a common longitudinally extending support member.

16. The apparatus of claim 14 wherein the heat shield members define the spaces therebetween as slits extending transversely to the longitudinal axis of the preform.

17. The apparatus of claim 14 wherein the heat shield members have a curved portion having a concave side facing the preform.

18. A process for the manufacture of a porous, elongated $SiO_2$ preform by deposition of $SiO_2$ particles on a mantle surface of a cylindrical carrier rotating about a longitudinal axis, said process comprising:
- forming the $SiO_2$ particles by means of a plurality of deposition burners which are supported spaced at a longitudinal distance from one another in a burner row extending substantially parallel to the longitudinal axis of the carrier,
- providing for reciprocal relative longitudinal movement between the preform and the deposition burner in repeating cycles such that each of the burners relatively reciprocates back and forth along the forming preform between respective turnaround points on the preform where the relative movement of the burner and the preform is reversed; and
- providing a heat shield structure that reduces overheating of the preform in regions adjacent the turnaround points, said heat shield structure being longitudinally fixed relative to the preform during said reciprocal relative longitudinal movement of the burners and the preform, said heat shield structure comprising a plurality of heat shield members spaced from the preform and each aligned with a longitudinal region between turnaround points on the preform, said heat shield members being spaced longitudinally of each other and providing therebetween heat sinks aligned with the turnaround points on the preform.

19. The process of claim 18 wherein said heat shield members are fixedly supported on a common longitudinally extending support member.

20. The process of claim 18 wherein cooling elements are provided between the heat shield members to act as the heat sinks.

* * * * *